Dec. 22, 1964

R. L. SMIRL 3,162,433

LEVELING VALVE MECHANISM

Filed Oct. 29, 1956

Inventor:
Richard L. Smirl
By: Keith J. Blever  Atty.

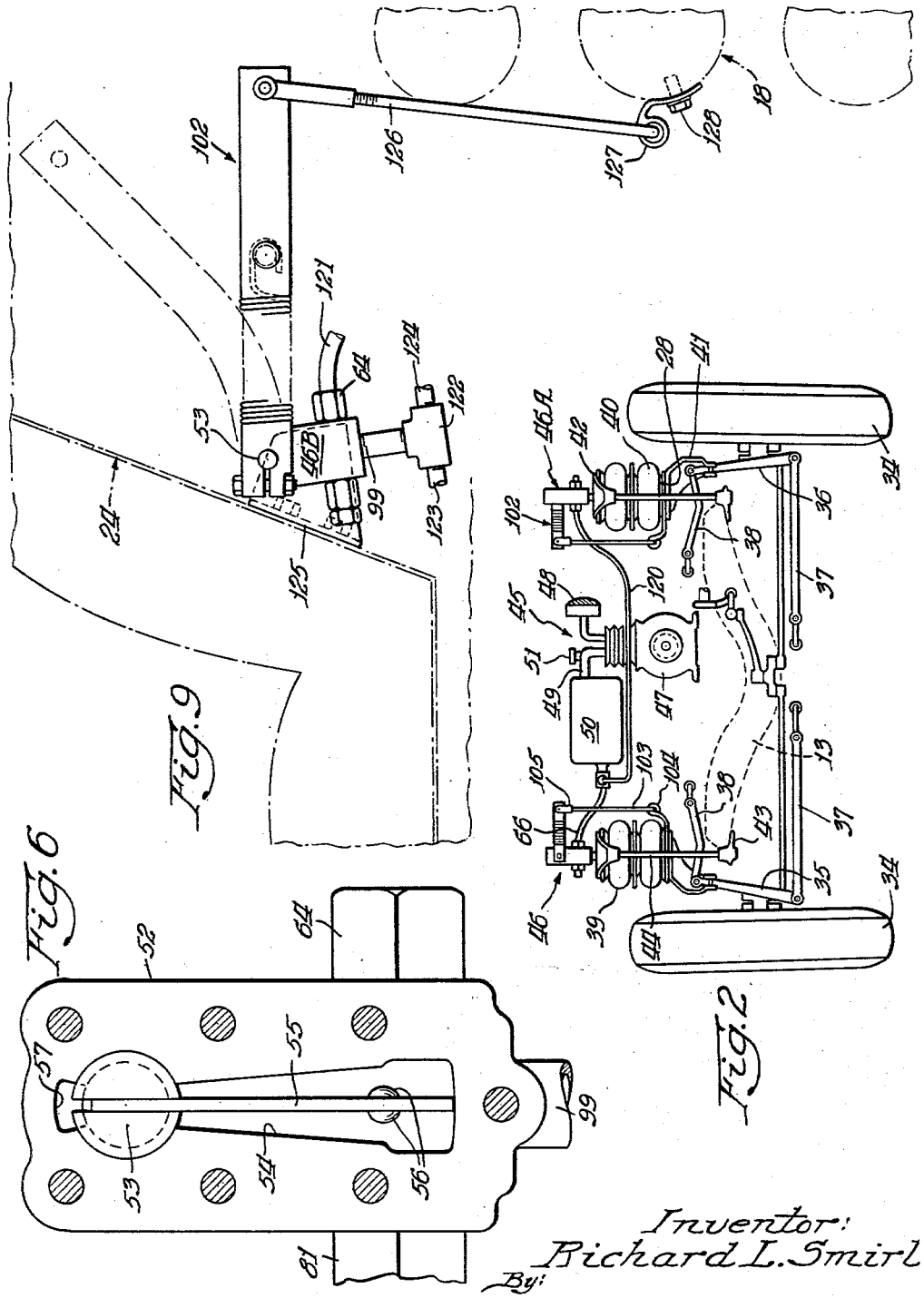

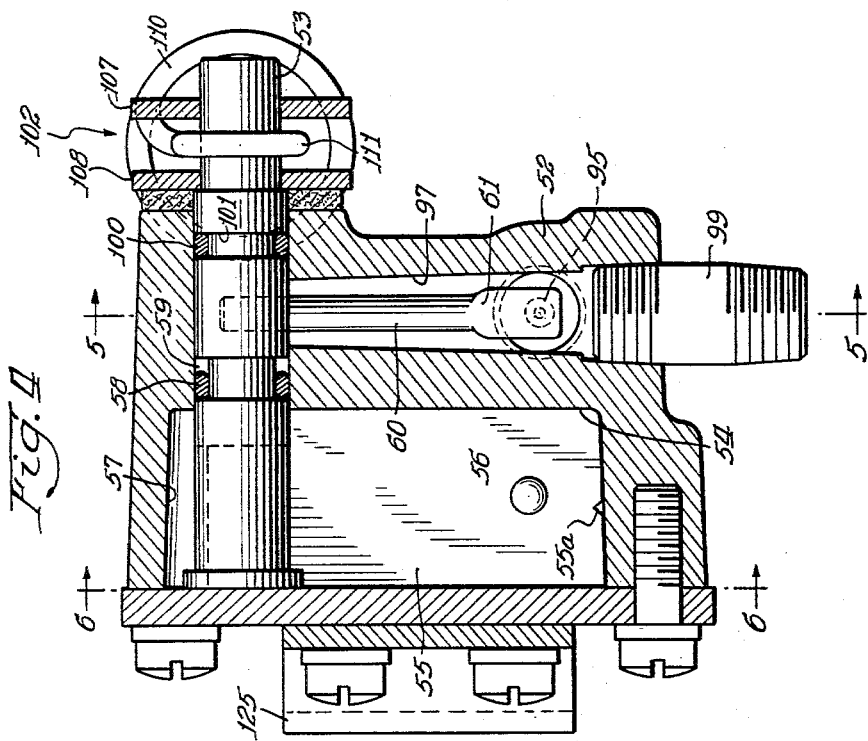
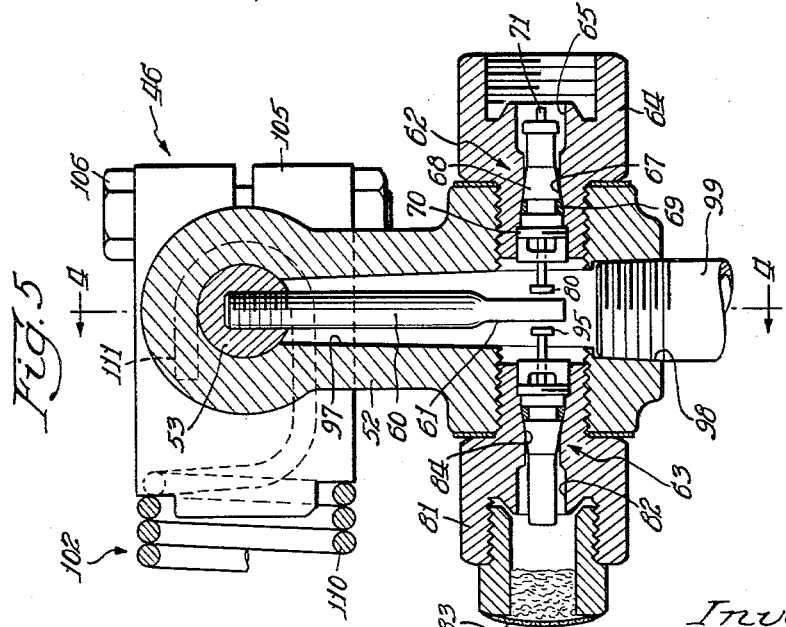

Dec. 22, 1964  R. L. SMIRL  3,162,433
LEVELING VALVE MECHANISM
Filed Oct. 29, 1956  5 Sheets-Sheet 4

Inventor:
Richard L. Smirl
By:
Keith J. Bleuer  Atty.

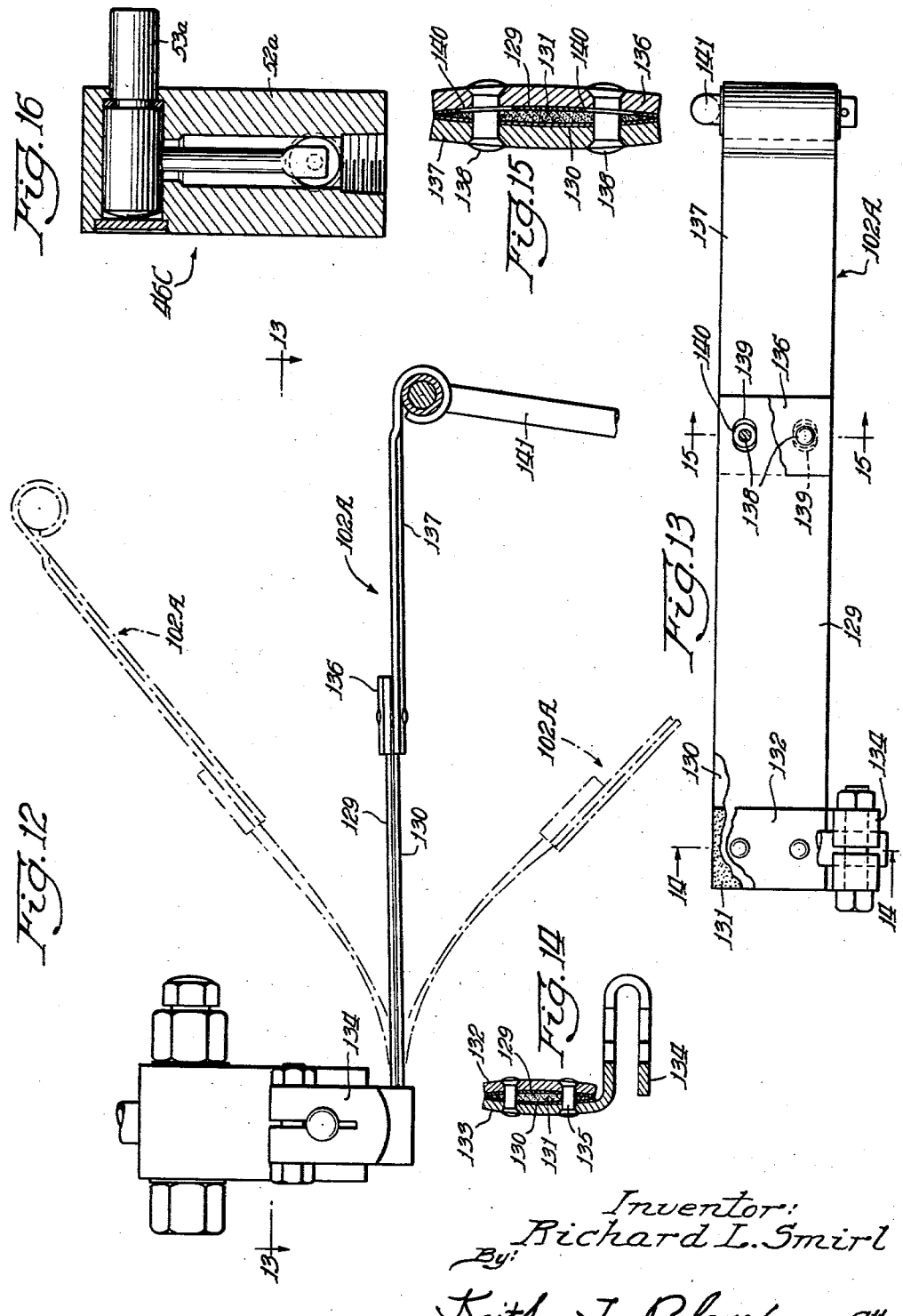

United States Patent Office 3,162,433
Patented Dec. 22, 1964

3,162,433
LEVELING VALVE MECHANISM
Richard L. Smirl, La Grange Park, Ill., assignor to Borg-Warner Corporation, Chicago, Ill., a corporation of Illinois
Filed Oct. 29, 1956, Ser. No. 618,837
13 Claims. (Cl. 267—65)

My invention relates to suspensions for vehicles and more particularly to vehicle air springs and to controlling valves for such air springs for maintaining the proper amount of air in them.

It has previously been proposed to utilize a number of air springs for suspending or supporting a vehicle body and frame with respect to the road wheels of the vehicle. Such air springs may comprise flexible bellows in which a volume of air is maintained. These bellows cushion the vehicle body quite well from road shocks and for the purpose of doing so are maintained relatively soft. A number of these air springs are used in a vehicle, such as one at each of the four corners of the vehicle frame. Since the air springs are quite soft, the addition of a load in the vehicle tends to cause the vehicle body to lean in the direction of the load.

It has, accordingly, been previously proposed to provide a source of air pressure and valve mechanism for supplying additional air from the air source to the air springs bearing the load, so as to return the vehicle body back into a horizontal normal position from its leaning position. Such valve mechanism is also operative, when the load is removed, for exhausting the air springs so as to relieve sufficient air therefrom to return the vehicle body to normal position with respect to the vehicle wheels. Such valve mechanism, as has previously been proposed, in general, is quite complicated and expensive; and it is, accordingly, an object of the present invention to provide an improved valve mechanism for the purpose of controlling air springs which is very simple in construction and economical of manufacture.

Such valve mechanisms previously proposed have included an air inlet valve connecting an air spring with a source of air pressure and an exhaust valve for the air spring. These air inlet and exhaust valves have been rather complicated and expensive in themselves, and it is, accordingly, an object of the present invention to provide an improved valve mechanism with air inlet and exhaust valves comprising as working parts the usual valve cores used in connection with the ordinary pneumatic tires of automobiles which, due to the very great quantities manufactured for use in such tires may be bought for only pennies apiece.

Such air spring controlling valve mechanisms preferably include mechanism for preventing the actuation of the inlet or exhaust valves with ordinary short duration road shocks, so that inflation of the air springs is automatically regulated to maintain a constant average standing height of the vehicle body regardless of load, the mechanisms taking no notice of the more rapid vertical motions of the road wheels. In prior valve mechanisms, for this purpose the exhaust valve and air inlet valve operation is heavily damped by pistons accurately machined so as to be slidably disposed with a close fit in a pair of cylinders, with a small diameter fluid passage connecting the cylinders.

The valve mechanisms generally are mounted fixed with respect to the vehicle body, and the pistons and air inlet and exhaust valves are connected by linkage to an axle of the vehicle frame.

It is also an object of the invention to provide improved damping mechanism which is very much simpler and may be much more economically manufactured than such prior art structures, and in particular, it is an object to provide such an improved damping mechanism in connection with an air spring leveling valve mechanism that consists of only a vane loosely disposed in a valve cavity containing a viscous liquid, the viscous liquid flowing around the vane in order to provide a time delay in movement of the vane and thus a delay in actuation of the exhaust and air inlet valves.

Spring mechanism has been provided in the prior art structures, so that movements between the vehicle body and vehicle frame may take place without corresponding movements of the pistons, and the more rapid vertical motions of the road wheels are not effective on the leveling valve mechanisms. It is also an object of the present invention to provide improved spring mechanism, particularly disposed in an actuating arm, for the leveling valve mechanism, which allows the arm to flex on the more rapid vertical motions of the road wheels. More particularly, it is an object to provide such an arm having pre-stressed spring means therein, so that a predetermined high moment is required on the arm in order to cause bending of the arm, whereby even the smallest basic changes in standing height of the vehicle body are effective on the leveling valve mechanism to cause correction of the vehicle standing height.

More particularly, it is an object to provide an embodiment of the invention which has a pre-stressed coiled spring in the actuating arm for the leveling valve mechanism, so that the predetermined moment is necessary in order to cause the convolutions of the spring to separate with the resultant flexing of the arm. It is also an object to provide an embodiment having bowed leaf springs which require the predetermined moment before flexing occurs.

The invention consists of the novel constructions, arrangements and devices to be hereinafter described and claimed for carrying out the above stated objects and such other objects, as will be apparent from the following description of preferred forms of the invention, illustrated with reference to the accompanying drawings, wherein:

FIG. 2 is a front view of the chassis taken on an enlarged scale;

FIG. 4 is a sectional view of one of my improved controlling valves, taken on line 4—4 of FIG. 5;

FIG. 5 is a sectional view taken on line 5—5 of FIG. 4;

FIG. 6 is a sectional view taken on line 6—6 of FIG. 4;

FIG. 9 is a side view of one of my controlling valves located at the rear of the vehicle chassis;

FIG. 12 is a side view of a modified form of arm assembly;

FIG. 13 is a top view of the arm assembly shown in FIG. 12;

FIG. 14 is a sectional view taken on line 14—14 of FIG. 13;

FIG. 15 is a sectional view taken on line 15—15 of FIG. 13;

FIG. 16 is a sectional view of a modified form of air spring controlling valve.

Like characters of reference designate like parts in the several views.

Figure 1:
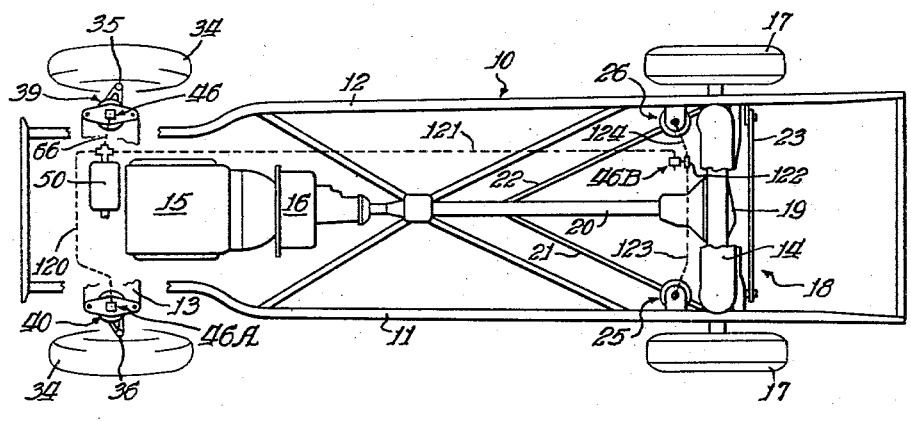
FIG. 1 is a top view of an automobile chassis in which my improved controlling valves for air springs are installed.

Referring now to the drawings and particularly to FIG. 1, my improved vehicle body leveling mechanism is shown installed on an automotive vehicle having a frame 10 with two side frame members 11 and 12. The frame members are connected together by a plurality of cross frame members including the cross frame members 13 and 14.

The vehicle includes a conventional engine 15 connected to the usual transmission 16. The rear driving road wheels 17 of the vehicle are mounted on a rear axle assembly 18 comprising a differential 19, and the usual propeller shaft 20 is drivingly disposed between the differential 19 and the transmission 16.

Rear axle strut rods 21 and 22 are provided between the propeller shaft 20 and the rear axle assembly 18, and a radius rod 23 is connected between one end of the axle assembly and the frame 10. The usual automobile body 24 is fixed in a conventional manner on the frame 10.

A pair of air springs 25 and 26 are disposed between the side frame members 11 and 12 and the rear axle strut rods 21 and 22 respectively for supporting the frame 10 and body 24 with respect to the rear axle assembly 18. Each of the air springs 25 and 26 comprises essentially a flexible bellows 27 which may be composed of layers of fabric and rubber-like material, for example. The bellows 27 are each fixed with respect to a bottom plate 28 and a top plate 29 so as to be air tight. An opening 30 is provided in the upper plate 29 for the admission of air pressure into the bellows 27 as will be described. An encircling metal band 31 is disposed around the middle of the bellows 27, so that the bellows has two large diameter folds 32 with a small diameter fold 33 therebetween.

The front dirigible road wheels 34 of the vehicle are rotatably disposed on knuckle supports 35 and 36, the knuckle support 35 being for the right front wheel and the knuckle support 36 being for the left front wheel. Each of the knuckle supports 35 and 36 is movably connected to the frame 10 by means of a lower control arm 37 and a support upper arm 38 which are respectively pivotally mounted to the cross frame member 13.

A pair of air springs 39 and 40 are effectively disposed between the cross frame member 13 and the knuckle supports 35 and 36, respectively. The air springs 39 and 40 are identical in detail with the air springs 25 and 26 as previously described. The lower plate 28 of the air spring 39 is fixed on a mounting bracket 41 clamped on the knuckle support 35, and the upper plate 29 of the air spring 39 is fixed to a bracket plate 42 which is connected with a bracket 43 on the cross frame member 13 through the intermediary of a rod 44. The air spring 40 is similarly, effectively disposed between the knuckle support 36 and the cross frame member 13 by means of similar brackets 41, 42, and 43 and rod 44.

The air springs 25, 26, 39 and 40 function to yieldably support the vehicle body 24 and the frame 10 with respect to the axle assembly 18 and the front wheels 34 due to air compressed within the bellows 27 of these air springs. An air pressure source 45 is provided for maintaining air pressure in the bellows 27 of the air springs 25, 26, 39 and 40; and in connection with both front wheels 34, I provide my improved leveling valve mechanism 46 and 46A, and I provide such a valve mechanism 46B which functions to control the air pressure simultaneously within both of the rear air springs 25 and 26.

The source of air pressure comprises an air compressor 47 of any suitable conventional construction having an air inlet 48 and an air outlet 49. The compressor 47 is driven from the vehicle engine 15 by any suitable connection, as from the usual fan belt. The compressor discharges into a pressure accumulator 50 which may constitute simply a closed sheet metal reservoir. A relief valve 51 of any suitable conventional construction may be connected to the outlet 49 so as to maintain the air pressure in the accumulator 50 at some predetermined maximum value such as, for example, between 150 to 250 p.s.i.

The leveling valve mechanism 46 for the right front wheel 34 comprises a valve body 52 having a shaft 53 extending therethrough and rotatable therein. A cavity 54 of generally triangular shape is provided in the valve body 52, and a vane 55 is fixed on the shaft 53 so as to be swingable back and forth in the cavity 54. The vane 55 is provided with a pair of bosses 56 on opposite sides thereof for limiting the swinging movement of the vane 55 in the cavity 54. The vane 55 fits loosely within the cavity 54 and in one particular embodiment, satisfactory results were obtained with .005 to .010 inch clearance between the edges of the vane and the surrounding sides of the cavity 54. The effective clearance between the vane 55 and the sides of the cavity 54 may also be increased, if desired, by providing a small notch 55a in an edge of the vane. A heavy viscous fluid is provided in the cavity 54 for delaying swinging movement of the vane 55 in the cavity 54 when a rotative force is put on the shaft 54. A heavy mineral oil, for example, may be used; however, preferably, a fluid which is not so subject to viscosity changes with temperature changes is preferred. A silicone fluid having a viscosity (at 25° centigrade) between 60,000 and 100,000 centistokes has been found to give good results. These are linear polydimethylsiloxanes chain stopped with trimethylsilyl groups in which the viscosity of the fluids is regulated by the chain length of the dimethylsiloxane units, disclosed, for example, in Winton I. Patnode Patents Nos. 2,469,888 and 2,469,890 both issued May 10, 1949. Such a silicone fluid has little change of viscosity with changes in temperature and incidentally, has the additional advantage of high resistance to mechanical shear breakdown.

The liquid in the cavity 54 expands and contracts to some extent with temperature changes, and I, therefore, provide an air cavity 57 and a movable O ring seal 58 about the shaft 53 for allowing for expansion of the liquid body in the cavity 54. The air cavity 57 is disposed above the shaft 53 in the upper part of the valve body 52, and the fluid may seep around the shaft 53 and into the cavity 57 whenever it expands unduly within the cavity 54. The O ring seal 58 is disposed in a circumferential groove 59 of greater length than the diameter of the seal 58, so that the seal 58 may move longitudinally of the shaft 53 in the groove 59. Thus, as the fluid in the cavity 54 increases in volume with increases in temperature, the fluid may seep around the shaft 53 so as to move the seal 58 to the right as seen in FIG. 4 and increase in effect the cavity volume for the fluid. If desired, either the slidable O ring seal 58 or the cavity 57 may be used for the purpose of providing augmented volume for the liquid in the cavity 54 to the exclusion of the other, and both the seal 58 and cavity 57 need not be simultaneously provided.

A lever 60 in the form of a stud having flats 61 on its free end is fixed within the shaft 53. The lever 60 is adapted to actuate an inlet valve 62 or an outlet valve 63.

The inlet valve 62 is provided in a nipple 64 which is screw threaded into the valve body 52. The nipple has a passage 65 therethrough which is connected to the air pressure accumulator 50 by a conduit 66. The valve 62 is conventional in construction, being of the type commonly used for automobile tires. The passage 65 in the nipple 64 is tapered at 67, and the valve 62 comprises a tapered sleeve portion 68 (see FIG. 7) having a circular seal 69 imbedded in it. A threaded sleeve 70 is coupled to but is rotatable with respect to the tapered sleeve portion 68, and the threaded sleeve 70 is threaded into the inner end of the passage 65 so as to hold the circular seal 69 in sealing relationship with respect to the tapered portion 67 of the passage 65.

A stem 71 having an enlarged head 72 thereon extends through an opening 73 in the sleeve 70. The head 72 carries a sealing washer 74 adapted to make a tight seal with the end lip 75 of the tapered sleeve portion 68.

The sealing washer 74 is yieldably held in sealing relationship with the lip 75 by means of a compression spring 76 disposed between an angular enlargement 77 on the stem 71 and a shoulder 78 provided in the tapered sleeve portion 68. An air hole 79 is provided in the sleeve 70. The stem 71 is provided with an enlarged flattened head 80 adapted to be contacted by one of the flats 61 on the lever 60.

The valve 63 is provided in a nipple 81 which has a longitudinal passage 82 extending therethrough. The passage 82 is open to atmosphere and has an air silencer 83, such as a body of steel wool or glass, therein. The passage 82 is provided with a tapered portion 84, and the valve 63 comprises a tapered sleeve portion 85 (see FIG. 8) disposed to fit in the tapered passage portion 84. A sealing ring 86 of yieldable material is provided in the tapered portion 85 and is adapted to seal the valve part 85 in the tapered pasage portion 84. A threaded sleeve 87 is fixed from longitudinal movement with respect to the valve portion 85 but is rotatable with respect to the latter, and the sleeve 87 is threaded in the inner end of the cavity 82 so as to hold the yieldable sealing ring 86 tightly in the tapered passage portion 84.

A stem 88 extends through the tapered valve part 85 and has a head 89 fixed on one end. The head 89 has a ring 90 of yieldable sealing material fixed thereto which is adapted to make an air tight seal with the end lip 91 of the valve part 85. A retainer sleeve 92 is fixed to the valve part 85, and a spring 93 is disposed between the inturned end of the sleeve 92 and the head 89 for yieldably holding the head 89 and its sealing ring 90 in sealing relationship with the lip 91. The spring 93, for purposes which will hereinafter be described, is considerably stronger than the spring 76 in the valve 62.

The stem 88 extends through an opening 94 provided in the sleeve 87, and is provided with a flattened head 95. An air opening 96 is provided in the sleeve 87. The valve 63 is also conventional in construction, being of the type commonly used for automobile tires.

The stems 71 and 88 of the valves 62 and 63 extend into a cavity 97 in the valve body 52 and are disposed adjacent to opposite flats 61 on the lever 60, so that the flats can contact the stems and move them. The body 52 is provided with an opening 98 therein in communication with the cavity 97, and a threaded nipple 99 mounts the valve body 52 on the top of the plate 29 of the air spring 39 and connects the interior of the bellows 27 of the air spring with the cavity 97. Air under pressure exists within the bellows 27 and in the cavity 97 as will be explained, and I preferably, therefore, provide an O type sealing ring 100 within a circumferential groove 101 in the shaft 53. The sealing rings 58 and 100 are disposed on opposite sides of the cavity 97 and seal the air pressure within the cavity 97.

An arm 102 (see FIGS. 10 and 11) is fixed on the shaft 53 and is connected at its outer end by means of a connecting rod 103 with a bracket portion 104 formed on the bottom plate 28 of the air spring 39. The arm 102 comprises a clevis 105 which is clamped on the shaft 53 by means of a screw 106. The clevis has two longitudinally extending side portions 107 and 108 which contact the end convolution 109 of a coiled cantilever spring 110. The clevis portions 107 and 108 are tightly held in contact with the end of the spring 110 by means of the end of the spring 111 which is looped about the shaft 53 and is held in stress by the shaft 53. The clevis portion 108 is provided with a reduced end portion 112 which extends inside the spring 110 and holds it fixed with respect to the clevis 105.

The arm 102 includes an end 113 which comprises a rectangular sheet of metal bent back upon itself to form two side portions 114 and 115. The side portion 115 is in contact with the end convolution 116 of the spring 110, and it tightly engages the end convolution by means of the spring end 117 which is looped about and is held in stress by a rivet 118 extending through the arm end 113. The side portion 115 of the end 113 is provided with a reduced portion 119 which extends into the spring 110 and assures that there can be no relative movement between the end convolutions 116 of the spring 110 and the arm end 113.

Figure 11:
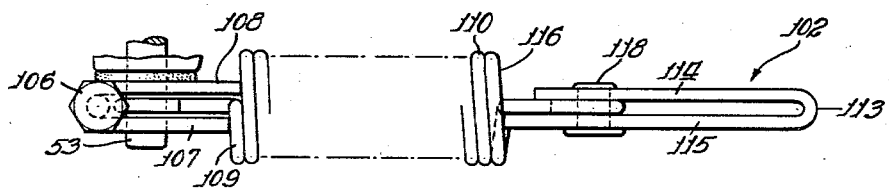
FIG. 11 is a top view of the arm assembly shown in FIG. 10.
Figure 10:
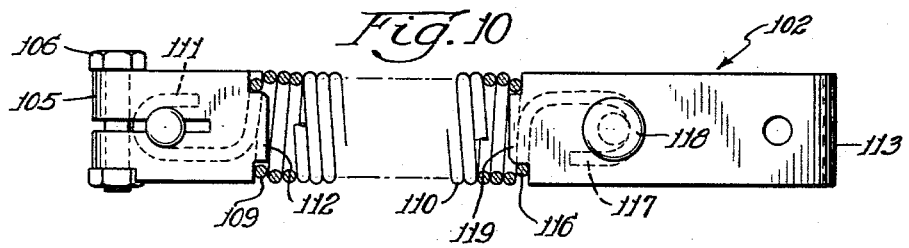
FIG. 10 is a side view of an arm assembly used with one of my improved valves.

As has just been mentioned, the looped spring ends 111 and 117 are stressed out of their free positions with respect to the rest of the spring 110 when the shaft 53 and the rivet 118 are passed through the looped spring ends. In addition to this stressing, the spring 110 is preloaded, that is, in its free condition or in its condition as shown in FIGS. 10 and 11, the convolutions of the spring 110 are tightly in contact with each other, so that it requires a predetermined force in order to bend the spring and bring the spring convolutions out of contact with each other.

The air pressure in the air spring 40 on the left side of the vehicle is controlled by means of a valve mechanism 46A which is identical to the valve mechanism 46 and by means of an identical arm assembly 102 and connecting link 103. The nipple 64 of the valve mechanism 46A is connected by means of a conduit 120 with the accumulator 50.

The air springs 25 and 26 on the rear of the vehicle are controlled by means of a valve mechanism 46B (see FIG. 9) which is identical with the valve mechanism 46. The nipple 64 of the valve mechanism 46B is connected by means of a conduit 121 with the accumulator 50. The nipple 99 of the valve mechanism 46B is connected by means of a T 122 and branch conduits 123 and 124 with the openings 30 in the top plates 29 of the air springs 25 and 26. The valve mechanism 46B is mounted on a portion of the vehicle body 24, which is just behind the rear seat in the vehicle, by means of a bracket 125. The arm assembly 102 for the valve mechanism 46B is connected by means of a connecting rod 126 to the rear axle assembly 18 just to one side of the differential 19. The rod 126 extends through a bracket 127 fastened to the axle assembly 18 by means of a stud 128.

An arm assembly 102A (see FIG. 12) may be used in lieu of the arm assembly 102 for each of the air springs 25, 26, 39 and 40. The arm assembly 102A utilizes leaf springs instead of coiled springs and gives approximately the same results. The arm assembly 102A may be seen to comprise two leaf springs 129 and 130. The leaf springs are transversely bowed outwardly from their edges and are held in such bowed condition by means of die castings 131, which are formed thicker at their centers than at their edges, inserted between the springs 129 and 130. One of the die castings 131 is disposed at one end of the springs 129 and 130; a curved plate 132 is disposed over the top leaf spring 129; and a curved plate portion 133 of a clevis 134 is disposed beneath the lower leaf spring 130. Rivets 135 are used for holding the die casting 131, the springs 129 and 130, the plate 132 and the clevis 134 together. The clevis 134 is fixed on the shaft 53 in place of the clevis 105 when the leaf spring assembly 102A is used in lieu of the spring assembly 102.

A second die casting 131 is used between the outer ends of the springs 129 and 130, a curved plate 136 and a stiff end arm 137. Rivets 138 are used for fixing the plate 136, end arm 137, springs 129 and 130 and the die casting 131 together. The top spring 129 is provided with slots 139 through which the rivets 138 extend, and a washer 140 is provided for each of the rivets 138 and is disposed in one of the slots 139.

The end arm 137 is bowed as seen in FIG. 15, so that it may hold the spring 130 bowed and also so that it may have rigidity longitudinally. A connecting link 141 may be used for connecting the outer end of the spring assembly 102A with the bracket 104 fixed to the knuckles 35 and 36, if the spring assembly is used for the front valves 46 or 46A, or with the bracket 127 fixed to the rear axle assembly 18 if the arm assembly 102A is used in connection with the valve mechanism 46B on the rear of the vehicle.

Figure 17:
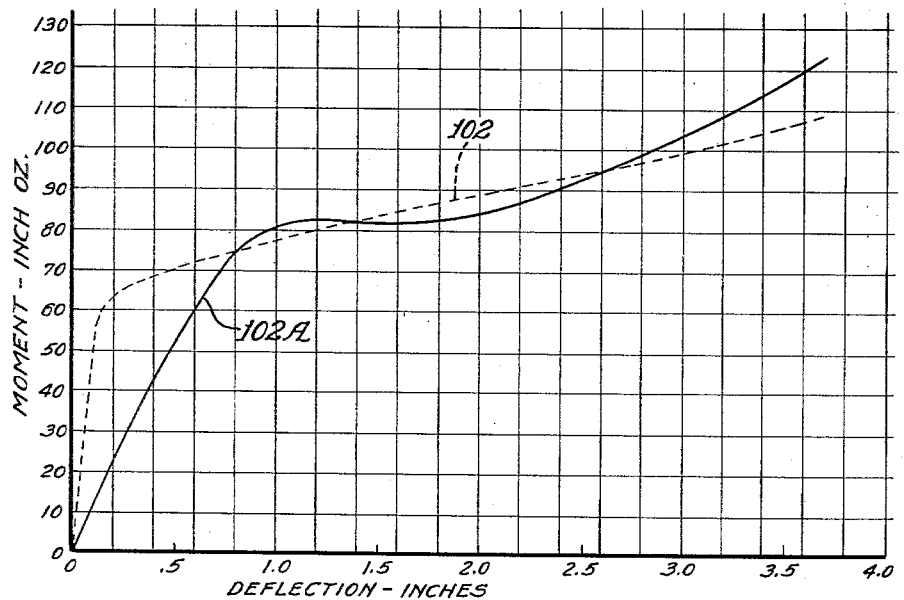
FIG. 17 is a graph showing the relation between moment and deflection in two particular samples of the FIG. 10 and FIG. 12 arm assemblies.

As has been previously mentioned, the spring 110 is preloaded, that is, the convolutions of the spring are tightly, but yieldably, held in contact by the inherent stress in the spring. Due to this pre-stressing, a certain force must be put on the end of the arm end 113 before the convolutions begin to separate. This is illustrated in the graph of FIG. 17 which shows that for a certain embodiment of the arm assembly 102, there was substantially no deflection at the end of the arm end 113 until a moment of 60 inch ounces was put on the end of the arm. As the moment was increased, the convolutions of the spring began to separate, and thereupon the deflection increased rather rapidly. The leaf spring arm assembly 102A exhibits the same characteristics and for an arm assembly 102A of the same length as the arm assembly 102, the graph of FIG. 17 shows a comparable relation between deflection and moment. The bowed conditions of the leaf springs 129 and 130 tended to maintain the arm assembly 102A with little deflection until a moment of approximately 80 inch ounces was applied on the end of the arm. There is more deflection with the arm assembly 102A until the leaf springs 129 and 130 begin to bend than there is with the arm assembly 102 until the convolutions of the spring begin to separate, as is shown from the FIG. 17 graph. Thereafter, once the leaf springs 129 and 130 begin to bend, there is a relatively large deflection on the end of the arm part 137 with increases in moment applied to the arm, but not so much with the coil spring 110 once its convolutions begin to separate.

The embodiment of valve 46C shown in FIG. 16 is the same as the valve 46 except that the shaft 53a is relatively short, and the body 52a does not have a cavity provided therein for a vane and viscous liquid, the time delay mechanism being dispensed with. The FIG. 11 form of valve may be substituted for the valves 46, 46A and 46B, and the same arms 102 or 102A may be used on the shaft 53a.

In operation, the valves 46, 46A and 46B function to maintain a certain amount of air in each of the air springs 39, 40, 25 and 26 which does not change unless the position of the vehicle frame 10 and the vehicle body 24 changes with respect to the wheels 34 and 17. With the air springs having this predetermined amount of air in them, the usual road shocks from the road wheels 34 and 17 are absorbed for the most part by the air springs.

The air spring 39, as has been explained, is positioned on the bracket 41 fixed to the knuckle support 35, and the top plate 29 of the air spring 39 is fixed with respect to the right portion of the front cross member 13 by means of the brackets 42 and 43 and the connecting rod 44. Thus, the usual road shocks applied on the knuckle support 35 from the right road wheel 34 is transmitted to the lower plate 28 of the air spring 39, and the flexible bellows 27 together with the air within the bellows 27 expands and contracts in accordance with the shocks, so that very little of the road shocks are transmitted to the front cross member 13 of the frame 10 and to the vehicle body 24 through the connecting rod 44. The air spring 40 likewise absorbs the usual road shocks on the knuckle support 36 on the left side of the vehicle, so that these road shocks are not transmitted through the link 44 on this side of the vehicle to the left end of the front cross member 13.

With reference to the rear end of the vehicle, road shocks from the rear wheels 17 are applied to the rear axle assembly 18 and thereby to the rear axle strut rods 21 and 22. The air springs 25 and 26 are positioned between the rods 21 and 22 and the side frame members 11 and 12, and thus, the usual shocks on the axle assembly 18 and rods 21 and 22 are absorbed by the flexible bellows 27 and by the air in the bellows of the air springs 25 and 26 and are not transmitted to the side frame members 11 and 12 and to the body 24.

The leveling valve mechanism 46 functions to maintain the predetermined amount of air in the bellows 27 of the air spring 39, as previously mentioned, unless the knuckle support 35 moves to a different position relative to the right end of the front cross member 13 and remains in this position for more than a predetermined time. In this event, the valve mechanism 46 will either let some of the air out of the air spring 39 or will allow more air to enter into the air spring 39 until the right end of the cross frame member 13 returns to its initial position with respect to the knuckle support 35 and thereby the front wheel 34 rotatably mounted thereon. Such a relative movement causing such functioning of the valve mechanism 46 may take place, for example, when the vehicle sways to either the right or the left on rounding a long curve or if an unusual amount of weight is in the front of the vehicle.

Assuming initially that the vehicle body and therefore the frame 10 move downwardly with respect to the knuckle support 35 and the road wheel 34 rotatably mounted thereon, and this condition continues for a substantial time, such as a few seconds, the connecting rod 103 will move the end of the arm assembly 102 connected therewith upwardly.

A corresponding moment is transmitted through the arm assembly 102, in particular through the arm end portion 113, the spring 110 and the clevis 105 to the shaft 53, tending to rotate the shaft 53 in a counter-clockwise direction as seen in FIGS. 5 and 6. Although this moment is applied to the shaft 53, the shaft 53 does not initially move due to the thick viscous liquid in the cavity 54 and the vane 55 in the cavity. There is a slight clearance around the vane 55, and in order for the shaft 53 and the van 55 to move, the viscous fluid must flow around the vane 55 to the other side of it. Initially, therefore, the spring 110 is flexed so as to allow the outer end arm portion 113 and the connecting rod 103 to move upwardly with respect to the valve body 52. The spring 110 being flexed and having its convolutions separated, maintains a steady moment on the shaft 53, so that the vane 55 moves in the cavity 54 with the viscous fluid in the cavity being forced to flow around the edges of the vane 55. Eventually, on this movement of the shaft 53, the lever 60 which is fixed to the shaft 53, strikes the enlarged end 80 of the valve 62 and moves the valve stem 71 and the enlarged head 72, so that the lip 75 is opened to the interior of the nipple 64 and the air conduit 66 connected therewith.

The compressor 47, being driven by the vehicle engine 15, supplies a fluid pressure to its outlet conduit 49 which is regulated to a predetermined value by means of the conventional relief valve 51. The air accumulator 50 maintains a supply of this air under predetermined pressure, and the air flows from the accumulator 50 through the conduit 66 and between the enlarged stem portion 72 and the lip 75, around the stem 71 within the tapered valve portion 68, and through the air hole 79 in the valve sleeve 70, the cavity 97, and the nipple 99 into the bellows 27 of the air spring 39. Additional air is thus supplied into the air spring 39 tending to expand the air spring and move the upper plate 29 upwardly with respect to the lower plate 28, so as to cause a similar movement of the right end of the front cross member 13 through the link 44, to return this end of the cross member 13 to the same relative position with respect to the knuckle support 35 and the wheel 34 mounted thereon. Any lowering or swaying of the vehicle body 24 and frame 10 is thus righted.

On such righting movement of the frame 10 and body 24, the upper plate 29 connected through the rod 44 with the right end of the front cross member 13 rises with respect to the knuckle support 35 to which the outer portion 113 of the arm assembly 102 is connected by means of the bracket 104, and the shaft 53 is rotated in the clockwise direction as seen in FIGS. 5 and 6 so as to return the vane 55 to its original median position, with the viscous liquid in the cavity 54 flowing back around the edges of the vane 55. The lever 60 being connected with the shaft 53 thus allows the spring 76 of the valve 62 to move the stem 71 back into its original position to seal the enlarged stem portion 72 on the lip 75 of the valve part 68, and the flow of fluid into the air spring 39 thus ceases.

When the vehicle comes out of the long turn or when the weight is relieved from the air spring 39, the air spring moves the right end of the front cross member 13 upwardly with respect to the knuckle support 35 and the wheel 35 mounted thereon, and under these conditions, the link 103 acting on the end of the arm 102 moves this arm downwardly with respect to the valve 46. The spring 110 of the arm initially is stressed, with the vane 55 in the viscous liquid preventing corresponding movement of the shaft 53 immediately, but gradually, the vane 55 moves clockwise as seen in FIG. 6 through the viscous liquid under the action of the stressed spring 110, and eventually the shaft 53, the vane 55 and the lever arm 60 move sufficiently so that the arm 60 strikes the enlarged stem end 95 of the valve 63 and moves the enlarged portion 89 of the valve off the lip 91 of the sleeve portion 85 of the valve 63 so as to open the valve. Air in the air spring 39 is thus exhausted through the nipple 81 and the valve 63 to atmosphere through the silencer 83, and this exhausting of the air causes the top plate 29 of the air spring 39 to lower with a consequent lowering of the right end of the front cross member 13. This lowering causes the connecting link 103 to move the end of the arm 102 upwardly and causes a corresponding counterclockwise movement of the shaft 53 so as to move the lever 60 out of contact with the stem 88 of the valve 63, so that the enlarged head portion 89 of the valve 63 moves back onto the lip 91 of the sleeve portion 85 under the action of the spring 93, thus stopping the exhaust of air from the air spring 39. The right end of the front cross member 13 is thus returned to its proper predetermined position with respect to the knuckle support 35 and the front wheel 34 rotatably mounted thereon.

In the event the right side of the vehicle tends initially to move upwardly, as when the vehicle is making a turn in the opposite direction; in this case, the arm 102 and connecting link 103 will cause the lever 60 to first move to actuate and open the exhaust valve 63 so as to decrease the amount of air in the air spring 39. The lever 60, when the correct positioning of the right end of the front cross member 13 with respect to the knuckle support 35 is reached, will move to close the exhaust valve 63; and when the vehicle tends to right itself on a subsequent straightway, for example, the lever 60 will be moved to open the inlet valve 62 and reinflate the air spring 39.

As has been previously described, the spring 110 is preloaded, so that it requires considerable force to separate the convolutions of the spring. For a particular embodiment, referring to the graph of FIG. 17, there was a deflection of only approximately 1/10 of an inch on the end of the arm assembly 102 with nearly a maximum moment of about 60 ounce-inches on the shaft 53 on which the arm assembly is mounted, the moment increasing relatively slowly with subsequent additional deflections of the end of the arm assembly. Thus, only slight relative movement between the knuckle support 35 and the wheel 34 mounted thereon with respect to the adjacent end of the front cross member 13 of the frame 10 is needed in order to put a moment on the shaft 53, and the valve 46 is thus very sensitive in maintaining the adjacent end of the front cross member 13 at the correct predetermined level with respect to the knuckle support 35 and the wheel 34 mounted thereon. It will be understood, of course, that the vane 55 within the body of viscous liquid in the cavity 54 moves only very slowly within the cavity, and therefore, although there is a moment on the shaft 53 from the arm assembly 102, it requires a substantial time for actual movement of the shaft 53 to take place, so that neither of the valves 62 and 63 is actuated by only the usual jars and road shocks encountered by the vehicle which are very short in duration. Such usual road shocks simply cause flexing of the spring 110 without corresponding movement of the shaft 53 due to the vane 55 within the body of viscous liquid, and ordinarily, there are no movements of the parts of the valve 46 within the valve body 52 during operation of the vehicle; a prolonged change in position between the adjacent end of the front cross member 13 and the adjacent wheel 34 is necessary before the valve 46 functions to correct the position of the front cross member 13 by either relieving air out of the air spring 39 or filling it to a greater extent from the compressor 47. The lever 60 can have only a limited swinging movement in the narrow cavity 97, and thus the rotation of the shaft 53 is correspondingly limited. If there is a relatively large change in position between the cross member 13 and the adjacent wheel 34, the shaft 53 cannot rotate correspondingly, and the arm assembly 110 thus remains bent, even after the valve 62 or the valve 63 is opened. The arm assembly 102 thus is effective also for compensating for the relatively small rotation that the shaft 53 may have.

The pressure in the cavity 97 connected with the air spring 39 is generally less than the pressure of the air source 45. The high pressure of the source is effective on the right end of the valve 62 as seen in FIG. 5 and tends to help the enlarged head portion 72 of the valve 62 to seal on the lip 75 of the tapered sleeve portion 68. Thus, a relatively weak spring 76 is required for the valve 62. The pressure in the cavity 97, on the other hand, is effective through the internal passages of the sleeve 87 and sleeve portion 85 on the enlarged head portion 89 tending to move the head portion 89 off the lip 91 against the action of the spring 93. In order to keep the valve 63 closed, it is thus necessary to use a relatively heavy spring 93 effective on the head portion 89 sealing it with the lip 91.

The valve 46A functions in the same manner as the valve 46 in order to maintain the left end of the front cross member 13 of the frame 10 at a predetermined height with respect to the knuckle support 36 and the road wheel 34 rotatably mounted thereon.

The valve 46B together with its arm assembly 102 functions to maintain the spacing between the rear axle assembly 18 and the body 24 at a predetermined distance in the same manner as the valves 46 and 46A function with respect to the ends of the front cross member 13 of the frame 10 and the knuckle supports 35 and 36. When the body 24 is too low relative to the rear axle asembly 18, the arm assembly 102 is moved upwardly at its end by means of the link 126 so that the valve assembly 46B is effective to supply additional fluid under pressure to the T 122 and the conduits 123 and 124 connected therewith and thereby to the air springs 25 and 26. On the other hand, if the body 24 at the rear of the vehicle is too high with respect to the axle assembly 18, the arm assembly 102 is moved downwardly due to the action of the link 126, and the valve 46B is effective to exhaust some of the air from the air springs 25 and 26 through the conduits 123 and 124 and the T 122. The only substantial difference in the operation of the valve 46B as compared to the valves 46 and 46A is that the valve 46B is effective on the two air springs 25 and 26 instead of simple on one air spring. The two valves 46 and 46A are relied on for maintaining the vehicle frame 10 and the body 24 level against side sway, and the single valve 46B functions to maintain the frame 10 and the body 24 level about an axis perpendicular to the direction of travel.

The arm assembly 102A, if used in connection with the valves 46, 46A and 46B, functions in general to provide the same action by the valves as is provided by the arm assembly 102. The leaf springs 129 and 130, being bowed, resist deformation until a predetermined moment is put on the end of the arm assembly 102A; and at that time, one of the springs 129 and 130 loses its bowed configuration transversely, and thereafter, little additional moment need be applied to the arm 102A for additional deflection. The characteristics of the leaf spring arm 102A as compared to the arm 102 is shown by the FIG. 17 graph. The leaf spring arm 102A, for small deflections, requires a greater deflection for the same moment applied to the shaft 53; and hence, the arm assembly 102A is not quite as sensitive for maintaining the correct spacing between the knuckle supports 35 and 36 and the front cross member 13 of the frame or between the body 24 and the rear axle assembly 18, but does in general perform this function. The arm end 137 is bowed and is stiff, and the bending thus takes place completely in the leaf springs 129 and 130. The slots 139 and the washers 140 within the slot are provided in order that one of the leaf springs 129 and 130 may move slightly with respect to the other at the junction with the stiff arm end 137.

The FIG. 16 embodiment valve 46C may be used in place of the valves 46, 46A and 46B, with either the arm assembly 102 or the arm assembly 102A being used with the valve 46C. The valves 62 and 63 in the valve assembly 46C open and close with movements of the frame 10 and body 24 with respect to the knuckle supports 35 and 36 and the rear axle assembly 18 in the same manner as when the valves 46, 46A and 46B are used; however, since the valve 46C does not contain a time delay mechanism such as the vane 55 movable in the cavity 54 containing viscous liquid, the valves 62 and 63 are opened and closed much more frequently than with the valves containing the time delay mechanism. The road shocks, substantially regardless of duration, are thus effective on the valves 62 and 63 of the FIG. 16 embodiment, and since the valves 62 and 63 are continuously opening and closing, a considerably larger capacity compressor 47 is required; however, there is some reduction in complication with the deletion of the time delay mechanism. The spring arms 102 and 102A in connection with the FIG. 16 embodiment of the valve, have no effect with respect to any time delay mechanism; however, they do allow the ends of the arms 102 and 102A to have a much greater deflection than would be allowed by the movement of the shaft 53, restricted in its movement by the lever 60 swinging in the relatively narrow cavity 97.

In summation, advantageously the vane 55 located in the closed cavity 54 provides a time delay before the shaft 53 can be moved by either the arm assembly 102 or the arm assembly 102A when there is such a load on the frame 10 as would tend to unduly compress any of the air springs. The time delay mechanism assures that the ordinary road shocks are not effective to move the shaft 53 and actuate either of the valves 62 and 63, and for ordinary driving with fixed loads in the vehicle, there is no movement of the shaft 53 and parts connected therewith due to the effect of the viscous liquid in the cavity 54 on the vane 55, and there is thus little or no wear on the parts of the valves 46, 46A and 46B. The vane 55 being loosely disposed in the cavity 54 in particular renders the valves economical of manufacture, since extreme care fitting the vane 55 with respect to the sides of the cavity 54 need not be taken. In the event that adjustment of the effective clearance between the vane 55 and the sides of the cavity 54 is desired, then the vane may be notched as at 55a. The use of the silicone fluid having a viscosity at 25° centigrade of 60,000 to 100,000 centistokes has advantageously been found to give a substantial desirable delay in actuation of either of the valves 62 and 63.

The use of the preloaded arm assembly 102 assures that even the smallest changes in distance between the vehicle wheels and the frame 10 and body 24, if sustained so that the time delay mechanism allows the shaft 53 to move, cause the valves 46, 46A and 46B to be actuated so as to correct the positioning of the body 24 with respect to the road wheels. Thus, up until a substantial moment on the arm assembly 102 is reached, such as, for example, 60 inch ounces as seen in the graph of FIG. 17, the arm 102 in effect acts as a rigid arm. After this moment is exceeded, then the spring 110 yields, and maintains a moment not greatly exceeding the 60 ounce inch moment on the shaft 53, so that actuation of one or the other of the valves 62 and 63 takes place. The lever 60, of course, has a restricted swinging movement in the narrow cavity 97, and thus the spring 110 remains flexed out of its straight condition until the valves 46, 46A or 46B corrects the positioning of the vehicle body and frame. The leaf spring arm 102A functions to provide the same advantages as the arm 102 since the leaves 129 and 130 are bowed and tend to remain in bowed shape, providing an initial rigidity which is only overcome after a predetermined high moment is put on the end of the arm 102A.

Figure 8:
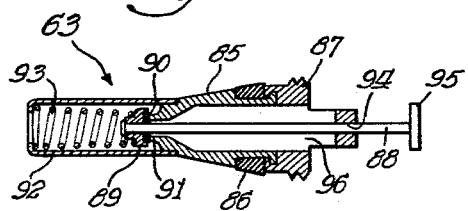
FIGS. 7 and 8 are respectively longitudinal sectional views of two different valve cores used in my improved controlling valve.
Figure 7:
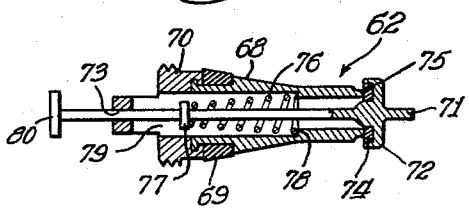
Figure 3:
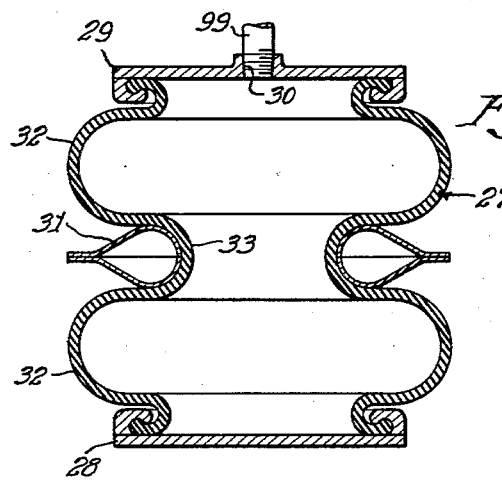
FIG. 3 is a vertical sectional view of one of the air springs.

The valves of my invention are very compact and may be economically manufactured. Such economy of manufacture is not only due to the looseness with which the vane 55 may be fitted in its cavity 54, but is also due to the fact that, if desired, the body 52 may be molded in a mold from plastic. The cores of the valves 62 and 63 are of conventional construction, being of the type used for ordinary pneumatic tires of automobiles. Such valve cores as they are shown in FIGS. 7 and 8, for example, may be obtained for a few pennies apiece, due to the fact that millions of these are used and sold every year for use in automobile pneumatic tires, being manufactured economically by automatic machinery.

The air chamber 57 and the slidable ring seal 58 advantageously provide room for an expansion of the silicone in the cavity 54 with temperature increase. In this connection, the body 52 may be formed of a plastic such as an epoxy plastic or bakelite. Plastic has, in general, a larger co-efficient of temperature expansion than does metal which would more nearly match the temperature co-efficient of expansion of the silicone fluid, so that only a very small air pocket 57 or slot 59 need be used in the body 52.

If no time delay is required in the valve, then the FIG. 16 valve without the vane 55 may be utilized. The valve 46C shown in this figure actuates the valves 62 and 63 as do the other valves 46, 46A and 46B so as to cause each of the air springs 39, 40, 25 and 26 to have the proper amount of air in them.

I wish it to be understood that the invention is not to be limited to the specific constructions and arrangements shown and described, except only insofar as the claims may be so limited, as it will be apparent to those skilled in the art that changes may be made without departing from the principles of the invention.

I claim:

1. In a mechanism for controlling the inflation of an air inflated air spring device from a source of air pressure for maintaining a substantially constant standing height of a vehicle body with respect to the vehicle wheels, the combination of a valve body, an air inlet valve in said body for connecting said air pressure source with said air spring device, an air exhaust valve in said valve body for exhausting air from said air spring device, a rotatable shaft in said valve body carrying a lever which has a limited movement in the valve body and is adapted to actuate one or the other of said valves when said shaft and lever are rotated in one direction or the other, and mechanical connections for actuating said shaft and adapted to be connected between the wheels and the vehicle body and shaft so that said shaft is rotated due to change of the vehicle body with respect to the wheels from the constant standing height, said connections including an arm on said shaft and adapted to be connected at its end to a part fixed with respect to one of the vehicle wheels, said arm comprising a coiled spring which is pre-stressed so that the convolutions of the spring do not separate until a predetermined moment is put on the end of the arm and which permits additional change of height of the vehicle body with respect to the vehicle wheels after said lever has reached the end of its travel.

2. In a mechanism for controlling the inflation of a fluid inflated vehicle suspension device from a source of fluid pressure for maintaining a substantially constant standing height of a vehicle body with respect to the vehicle wheels, the combination of valving for either connecting said fluid pressure source with said suspension device or for exhausting fluid from said suspension device, a rotatable shaft for actuating said valving on rotation in one direction or the other of the shaft, means providing a drag on the rotation of said shaft so that a moment must be put on the shaft for a substantial time before the shaft can rotate sufficiently to actuate said valving, and mechanical connections for actuating said shaft and adapted to be connected between the wheels and the vehicle body and shaft so that said shaft is rotated due to change of the vehicle body with respect to said vehicle wheels from said constant standing height, said mechanical connections including an arm on said shaft having a coiled spring therein so as to bend and maintain a moment on said shaft to rotate the shaft against said drag means on a change in position of the vehicle body with respect to the wheels, said coiled spring being pre-stressed so that a substantial moment must be put on the arm before the convolutions of said spring begin to separate whereby small changes in position of said vehicle body with respect to the vehicle wheels are effective to provide a moment on said shaft sufficient for actuating said valving.

3. In a mechanism for controlling the inflation of an air inflated vehicle air spring device from a source of air pressure for maintaining a substantially constant standing height of a vehicle body with respect to the vehicle wheels, the combination of a valve body, valving in said valve body for either connecting said air pressure source with said air spring device or for exhausting air from said air spring device, a shaft carrying a lever rotatably disposed in said valve body for actuating said valving on rotation in one direction or the other of the shaft, said valve body being formed with a cavity therein, a vane fixed on said shaft and spaced longitudinally along said shaft from said lever and disposed loosely in said cavity, a viscous liquid in said cavity which may flow between the sides of said vane and said cavity so as to provide a drag on the rotation of said shaft so that a moment must be put on said shaft for a substantial time before said shaft can rotate sufficiently to actuate said valving, and mechanical connections for actuating said shaft and adapted to be connected between the wheels and the vehicle body and shaft so that said shaft is rotated due to change of the vehicle body with respect to said vehicle wheels from said constant standing height, said mechanical connections including an arm on said shaft having a coiled spring therein so as to bend and maintain a moment on said shaft to rotate the shaft against the drag effect on said vane on a change in position of the vehicle body with respect to the vehicle wheels, said coiled spring being pre-stressed so that a substantial moment must be put on the arm before the convolutions of said spring begin to separate whereby small changes in position of said vehicle body with respect to the vehicle wheels are effective to provide a moment on said shaft sufficient for actuating said valving.

4. In a mechanism for controlling the inflation of an air inflated air spring device from a source of air pressure for maintaining a substantially constant standing height of a vehicle body with respect to the vehicle wheels, the combination of a valve body, an air inlet valve in said valve body for connecting said air pressure source with said air spring device, an air exhaust valve in said valve body for exhausting air from said air spring device, said valves comprising spaced and coaxially disposed valve stems each having a head thereon movable out of sealing relation with a tubular valve part with an air passage therethrough, a lever carried by said shaft disposed between said valve stems and movable to actuate either of said valve stems depending on the direction of rotation of said shaft, a vane carried by said shaft and spaced longitudinally along said shaft from said lever and loosely disposed in a cavity provided in said valve body, a viscous liquid in said cavity which may flow between the sides of said vane and said cavity for providing a drag on the rotation of said shaft so that a moment must be put on said shaft for a substantial time before said shaft can rotate sufficiently to actuate either of said valves, and mechanical connections for actuating said shaft and adapted to be connected between the wheels and the vehicle body and shaft so that said shaft is rotated due to change of the vehicle with respect to said vehicle wheels from said constant standing height, said mechanical connections including an arm on said shaft having a coiled spring therein so as to bend and maintain a moment on said shaft to rotate the shaft against the drag by said vane on a change in position of the body with respect to the wheels, said coiled spring being pre-stressed so that a substantial moment must be put on the arm before the convolutions of said spring begin to separate whereby small changes in position of said vehicle body with respect to the vehicle wheels are effective to provide a moment on said shaft sufficient for actuating either of said valves.

5. In valve mechanism, the combination of a valve body, an air inlet valve in said valve body, an air exhaust valve in said valve body, said valves comprising spaced coaxial valve stems each of which has a head movable into sealing relation with a tubular valve part having an air passage therethrough, a spring for urging each of said heads into such sealing position, a shaft rotatably disposed in said valve body, a lever carried by said shaft and disposed between said valve stems so as to open either of said valves depending on the direction of rotation of said shaft, a vane fixed to said shaft and spaced longitudinally along said shaft from said lever and loosely disposed in a cavity formed in said valve body, a viscous liquid in said cavity which may flow between the sides of said vane and cavity so as to impose a drag on the vane and thereby on said shaft, and an arm having a coiled spring therein and fixed on said shaft which may be bent to maintain a moment on said shaft to rotate the shaft against the drag imposed by said vane for opening either of said valves after a predetermined time, said coiled spring being pre-stressed so that the convolutions thereof stay in contact until a predetermined moment is put on said arm so that the arm is substantially rigid for lesser moments thereon.

6. In a mechanism for controlling the inflation of an air inflated vehicle air spring device from a source of air pressure for maintaining a substantially constant standing height of a vehicle body with respect to the vehicle wheels, the combination of a valve body, valving in said valve body comprising valve actuators for either connecting said air pressure source with said air spring device or for exhausting air from said air spring device, a rotatable shaft mounted in said valve body, a lever carried by said shaft for actuating said valving when said shaft is rotated in one direction or the other, means in said valve body defining a first cavity in communication with said valving, means in said valve body defining a second cavity, a viscous liquid in said second cavity, sealing means on said shaft for retaining said viscous liquid in said second cavity, a vane carried by said shaft and swingably disposed in said second cavity, said vane and second cavity being so constructed and arranged that said liquid may flow from one side of the vane to the other when a moment is put on said shaft so as to provide a drag on the rotation of said shaft, and mechanical connections for actuating said shaft and adapted to be connected between the wheels and the vehicle body and said shaft so that said shaft is rotated due to change of the position of the vehicle body with respect to the wheels from the constant standing height, said connections including a pre-loaded resilient arm connected to said shaft which bends and maintains a moment on said shaft to rotate the shaft against the drag effect of said vane for actuation of said valving on a change in position of the vehicle body with respect to the wheels.

7. In a mechanism for controlling the inflation of an air inflated vehicle air spring device from a source of air pressure for maintaining a substantially constant standing height of a vehicle body with respect to the vehicle wheels, the combination of a valve body, valving in said valve body comprising valve actuators for either connecting said air pressure source with said air spring device or for exhausting air from said air spring device, a shaft rotatably disposed in said valve body, a lever carried by said shaft for actuating said valving on rotation in one direction or the other of the shaft, means in said valve body defining a first cavity in communication with said valving, means in said valve body defining a second cavity, means separating said second cavity from said first cavity, a vane fixed on said shaft and disposed loosely in said second cavity, a viscous liquid in said second cavity which may flow between the sides of said vane and said second cavity so as to provide a drag on the rotation of said shaft so that a moment must be put on said shaft for a substantial time before said shaft can rotate sufficiently to actuate said valving, and mechanical connections for actuating said shaft and adapted to be connected between the wheels and the vehicle body and said shaft so that said shaft is rotated due to change of the position of the vehicle body with respect to the vehicle wheels from the constant standing height, said mechanical connections including a resilient arm on said shaft which bends and maintains a moment on said shaft to rotate the shaft against the drag effect on said vane acting on said viscous liquid on a change in position of the vehicle body with respect to the vehicle wheels.

8. In a mechanism for controlling the inflation of an air inflated vehicle air spring device from a source of air pressure for maintaining a substantially constant standing height of a vehicle body with respect to the vehicle wheels, the combination of a valve body, valving in said body for either connecting the air pressure source with the air spring device or for exhausting air from the air spring device, a shaft rotatably disposed in said body for actuating said valving on rotation in one direction or the other of said shaft, means in said valve body defining a first cavity adapted to receive air when said valving is actuated, means in said valve body defining a second cavity, a vane fixed on said shaft and loosely disposed in said second cavity, means separating said second cavity from said first cavity, a viscous liquid in said second cavity which may flow between the sides of said vane and said second cavity so that said vane acts to provide a drag on the rotation of said shaft whereby a moment must be put on said shaft for a substantial time before said shaft can rotate sufficiently to actuate said valving, and mechanical connections for actuating said shaft and adapted to be connected between the wheels and the vehicle body and shaft so that said shaft is rotated due to change of the vehicle body with respect to the vehicle wheels from said constant standing height.

9. In a mechanism for controlling the inflation of an air inflated air spring device from a source of air pressure for maintaining a substantially constant standing height of a vehicle body with respect to the vehicle wheels, the combination of a valve body, an air inlet valve in said valve body for connecting said air pressure source with said air spring device, an air exhaust valve in said valve body for exhausting air from said air spring device, a rotatable shaft in said valve body carrying a lever which is adapted to actuate one or the other of said valves when said shaft and lever are rotated in one direction or the other, a vane fixed on said shaft and spaced longitudinally along said shaft from said lever and loosely disposed in a cavity formed in said valve body, a viscous liquid in said cavity which may flow between the sides of said vane and said cavity so that said vane functions as a drag means for retarding the rotation of said shaft, and mechanical connections for actuating said shaft and adapted to be connected between the wheels and the vehicle body and shaft so that said shaft is rotated due to change of position of the vehicle body with respect to the vehicle wheels from said constant standing height, said connections including a pre-loaded resilient arm connected to said shaft which functions to rotate said shaft only when a predetermined moment is applied to said arm.

10. In valve mechanism, the combination of a valve body, a fluid inlet valve in said valve body, a fluid exhaust valve in said valve body, said valves comprising spaced valve actuators, a rotatable shaft in said valve body, a lever carried by said shaft and extending between said valve actuators so as to actuate either of them depending on the direction of rotation of said shaft, means in said valve body defining a first cavity for communication with said valves, means in said valve body defining a second cavity, a vane fixed to said shaft in spaced relation to said lever and disposed within said second cavity, and a viscous liquid in said second cavity, means separating said second cavity from said first cavity including sealing means on said shaft to prevent said viscous liquid from entering said first cavity, said vane being so constructed and arranged as to allow flow of said viscous liquid from one side of said vane to the other within said second cavity so that said viscous liquid imposes a drag on said vane and thereby on said shaft whereby said lever can be moved to actuate either of said valves by a sustained moment applied to said shaft.

11. In valve mechanism, the combination of a valve body, a fluid inlet valve in said valve body, a fluid exhaust valve in said valve body, said valves comprising spaced coaxial valve stems each of which has a head movable into sealing relation with a tubular valve part having a fluid passage therethrough, a spring for urging each of said heads into such sealing position, a shaft rotatably disposed in said valve body, a lever carried by said shaft and disposed between said valve stems so as to open either of said valves depending on the direction of rotation of said shaft, means in said valve body defining a first cavity for communicating with said fluid passages when said valves are opened, means in said valve body defining a second cavity, means separating said second cavity from said first cavity, a vane fixed to said shaft in spaced relation to said lever and loosely disposed in said second cavity, a viscous liquid in said second cavity which may flow between the sides of said vanes and said second cavity so as to impose a drag on the vane and thereby on said shaft, and a pre-loaded resilient arm on said shaft which may be bent to maintain a moment on said shaft to rotate the shaft against the drag imposed by said vane so as to cause said lever to open either of said valves after a predetermined time.

12. In a mechanism for controlling the inflation of an air inflated vehicle air spring device from a source of air pressure for maintaining a substantially constant standing height of a vehicle body with respect to the vehicle wheels, the combination of a valve body, valving in said body for either connecting the air pressure source with the air spring device or for exhausting air from the air spring device, a shaft rotatably disposed in said body for actuating said valving on rotation in one direction or the other of said shaft, means in said valve body defining a first cavity adapted to receive air when said valving is actuated, means in said valve body defining a second cavity, a vane fixed on said shaft and loosely disposed in said second cavity, means separating said second cavity from said first cavity, damping fluid in said second cavity which may flow between the sides of said vane and said second cavity so that said vane acts to provide a drag on the rotation of said shaft whereby a moment must be put on said shaft for a substantial time before said shaft can rotate sufficiently to actuate said valving, and mechanical connections for actuating said shaft and adapted to be connected between the wheels and the vehicle body and shaft so that said shaft is rotated due to change of the vehicle body with respect to the vehicle wheels from said constant standing height.

13. In a mechanism for controlling the inflation of an air inflated vehicle air spring device from a source of air pressure for maintaining a substantially constant standing height of a vehicle body with respect to the vehicle wheels, the combination of a valve body, valving in said body for either connecting the air pressure source with the air spring device or for exhausting air from the air spring device, a shaft rotatably disposed in said body for actuating said valving on rotation in one direction or the other of said shaft, means in said valve body defining a first cavity adapted to receive air when said valving is actuated, means in said valve body defining a second cavity, vane means carried by and operable by movement of said shaft and disposed for movement within said second cavity, means separating said second cavity from said first cavity, damping fluid in said second cavity effective to provide a drag as said vane means are moved in said second cavity so that said vane means act to provide a drag on the rotation of said shaft whereby a moment must be put on said shaft for a substantial time before said shaft can rotate sufficiently to actuate said valving, said shaft being adapted for actuation by mechanical means connected between the wheels and the vehicle body and shaft so that said shaft is rotated due to change in the vehicle body with respect to the vehicle wheels from said constant standing height.

References Cited in the file of this patent
UNITED STATES PATENTS

| | | |
|---|---|---|
| 751,576 | Veeder | Feb. 9, 1904 |
| 1,369,946 | Tibbetts | Mar. 1, 1921 |
| 2,079,899 | Christman | May 11, 1937 |
| 2,490,311 | Du Rostu | Dec. 6, 1949 |
| 2,646,950 | Nelson et al. | July 28, 1953 |
| 2,670,201 | Rossman | Feb. 23, 1954 |
| 2,778,656 | May | Jan. 22, 1956 |

FOREIGN PATENTS

| | | |
|---|---|---|
| 444,540 | Great Britain | Mar. 23, 1936 |

OTHER REFERENCES

"Manual on Design and Application of Leaf Springs," published by S.A.E., November 1944, pages 43 and 44 relied on.